United States Patent
Tu et al.

(10) Patent No.: US 7,415,421 B2
(45) Date of Patent: Aug. 19, 2008

(54) METHOD FOR IMPLEMENTING AN ENGINEERING CHANGE ACROSS FAB FACILITIES

(75) Inventors: Shih-Wen Tu, Taipei (TW); Ko-Pin Lee, Taichung (TW); Tzu-Yu Chang, Hsin-Chu (TW); Chie-Ming Yang, Hsin-Chu (TW); Ming-Yu Chuang, Hsin-Chu (TW); Allen Liao, Shindian (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 1228 days.

(21) Appl. No.: 10/365,260

(22) Filed: Feb. 12, 2003

(65) Prior Publication Data

US 2004/0158484 A1 Aug. 12, 2004

(51) Int. Cl.
*G06F 9/44* (2006.01)
*G06F 17/50* (2006.01)
(52) U.S. Cl. ............................................. 705/7
(58) Field of Classification Search ................. 148/43, 148/106; 438/552, 301
See application file for complete search history.

(56) References Cited

U.S. PATENT DOCUMENTS

| 3,138,743 | A * | 6/1964 | Kilby | 257/539 |
| 5,191,534 | A * | 3/1993 | Orr et al. | 700/105 |
| 6,631,305 | B2 * | 10/2003 | Newmark | 700/110 |
| 2003/0110067 | A1 * | 6/2003 | Miller et al. | 705/8 |
| 2003/0135403 | A1 * | 7/2003 | Sanderson et al. | 705/8 |
| 2004/0243267 | A1 * | 12/2004 | Tu et al. | 700/105 |

OTHER PUBLICATIONS

Pyzdek, Thomas. The Six Sigma Handbook. New York: McGraw-Hill, 2000. 1-710.*
Goyal, Niraj. "Applying Lean Manufacturing to Six Sigma—a Case Study." ISixSigma. Jun. 27, 2002. Aug. 17, 2007 <http://web.archive.org/web*/http://www.isixsigma.com/library/content/c020225a.asp>.*
Matthew Ainscough, Kevin Neailey and Charles Tennant, A self-assessment tool for implementing concurrent engineering through change management, International Journal of Project ManagementVol. 21, Issue 6, Selected papers from the Fifth Biennial Conference of the International Research Network for Organizing by Projects. Held in Renesse, Seeland.*
Jay Coombs, Lisa S Dabbon. (Oct. 1998). Manufacturing success. Inform, 12(9), 38-39. Retrieved Jan. 16, 2008, from ABI/INFORM Global database. (Document ID: 35296212).*
Stark, John. "Engineering Change Management." Engineering Change Management. the Management of Engineering Change. Feb. 02, 2002. Jan. 8, 2008 <http://web.archive.org/web/*/http://www.johnstark.com/ec1.html>.*

(Continued)

*Primary Examiner*—Romain Jeanty
*Assistant Examiner*—Folashade Anderson
(74) *Attorney, Agent, or Firm*—Duane Morris, LLP (57) ABSTRACT

A method for managing a plurality of fabrication facilities comprises the steps of: identifying a proposed new or modified fabrication method, evaluating the fabrication method against decision criteria based on use of the fabrication method to fabricate a first product at a first one of the fabrication facilities, verifying the fabrication method against the decision criteria, based on using the fabrication method to fabricate a second product at a second one of the fabrication facilities, and adopting the fabrication method as a best known method among the plurality of fabrication facilities, if the fabrication method satisfies the decision criteria.

20 Claims, 3 Drawing Sheets

OTHER PUBLICATIONS

"2001 Award Recipients Application Summaries." Baldrige National Quality Program. Apr. 14, 2003. National Institute of Standard and Technology. Jan. 14, 2008 <http://web.archive.org/web/20030414074321/www.quality.nist.gov/2001_Application_Summaries.html>.*

Kasunic, Mark. "An Intergrated View of Process and Measurement." Carnegie Mellon University. US Department of Defense. Jan. 16, 2008 <http://www.sei.cmu.edu/sema/pdf/intergrated-view-process.pdf>.*

"Software Engineering Institute." Carnegie Mellon University. Nov. 23, 2007 <http://www.sei.cmu.edu/ideal/ideal.bridge.html>.*

Kerzner, Harold. Project Management a Systems Approach to Planning, Scheduling and Controlling. 8th ed. Hoboken: John Wiley & Sons, Inc., 2003.*

Pyzdek, Thomas. The Six Sigma Handbook. New York: McGraw-Hill, 2001. (supplemental pgs to those provided in FAOM).*

* cited by examiner

FIG. 1

| CAT | BENEFIT ? | SIDE EFFECTS ? | SUPPORTS STANDARDIZATION ? | RECOMMENDED DECISION |
|---|---|---|---|---|
| 1 | MEETS CRITERIA | NO | | ADOPT AS BKM |
| 2 | MEETS CRITERIA | YES | | T/B DISCRETION |
| 3 | BELOW CRITERIA | NO | AGAINST | REJECT |
| 4 | BELOW CRITERIA | NO | COMPLIES | T/B DISCRETION |
| 5 | BELOW CRITERIA | YES | | REJECT |
| 6 | NO BENEFIT | | | REJECT |
| 7 | PREVENTS MAJOR PROBLEM | | | T/B DISCRETION |

METHOD FOR IMPLEMENTING AN ENGINEERING CHANGE ACROSS FAB FACILITIES

FIELD OF THE INVENTION

The present invention relates to engineering change management.

BACKGROUND

Many companies have a plurality of fabrication facilities (referred to herein as, "fabs") with at least partially overlapping fabrication process technologies (e.g., common processes) in use at the various fabs. The fabs may be spread over small or large geographic areas, and may produce product mixes that have small or large overlaps in processing technologies. To provide the most effective use of equipment, maximize yield, and minimize defective products, it is desirable to coordinate the use of a best known method (BKM) across fabs using a given common process technology, particularly if the fabs are making the same product.

During production operations, one of the fabs may detect a problem that must be solved by implementing a change to one or more processing steps or conditions at that fab. Although the problem may not yet have arisen (or been detected) at any other fab, the other fabs sharing the same process technology might benefit from implementation of the same change. Further, if a new fab is established, and the previously existing fabs do not all maintain the same processes, the new fab may implement methods that are inferior to the BKMs. Prior engineering procedures do not provide a satisfactory method for managing the engineering change process.

SUMMARY OF THE INVENTION

A method for managing a plurality of fabrication facilities comprises the steps of: identifying a proposed new or modified fabrication method, evaluating the fabrication method against decision criteria based on use of the fabrication method to fabricate a first product at a first one of the fabrication facilities, verifying the fabrication method against the decision criteria, based on using the fabrication method to fabricate a second product at a second one of the fabrication facilities, and adopting the fabrication method as a best known method among the plurality of fabrication facilities, if the fabrication method satisfies the decision criteria.

GLOSSARY

| | |
|---|---|
| BKM: | Best Known Method |
| CIP: | Continuous Improvement Project |
| CP/FT: | Circuit Probe/Final Test |
| Cpk: | absolute value of the closest device specification value to the mean, minus the mean, divided by half of the process width (3 sigma). |
| ECCP: | Engineering Change Control Plan |
| ECN | Engineering Change Notice (permanent) |
| FCCB: | Fab Change Control Board |
| PRS: | Process Release Standard |
| STD: | Standardization |
| STR: | Special Test Request |
| T/B: | Technical Board |
| TECN: | Temporary Engineering Change Notice |
| TTD: | Technology Transfer Division |
| WAT: | Wafer Acceptance Test |

DETAILED DESCRIPTION

Figure 1:
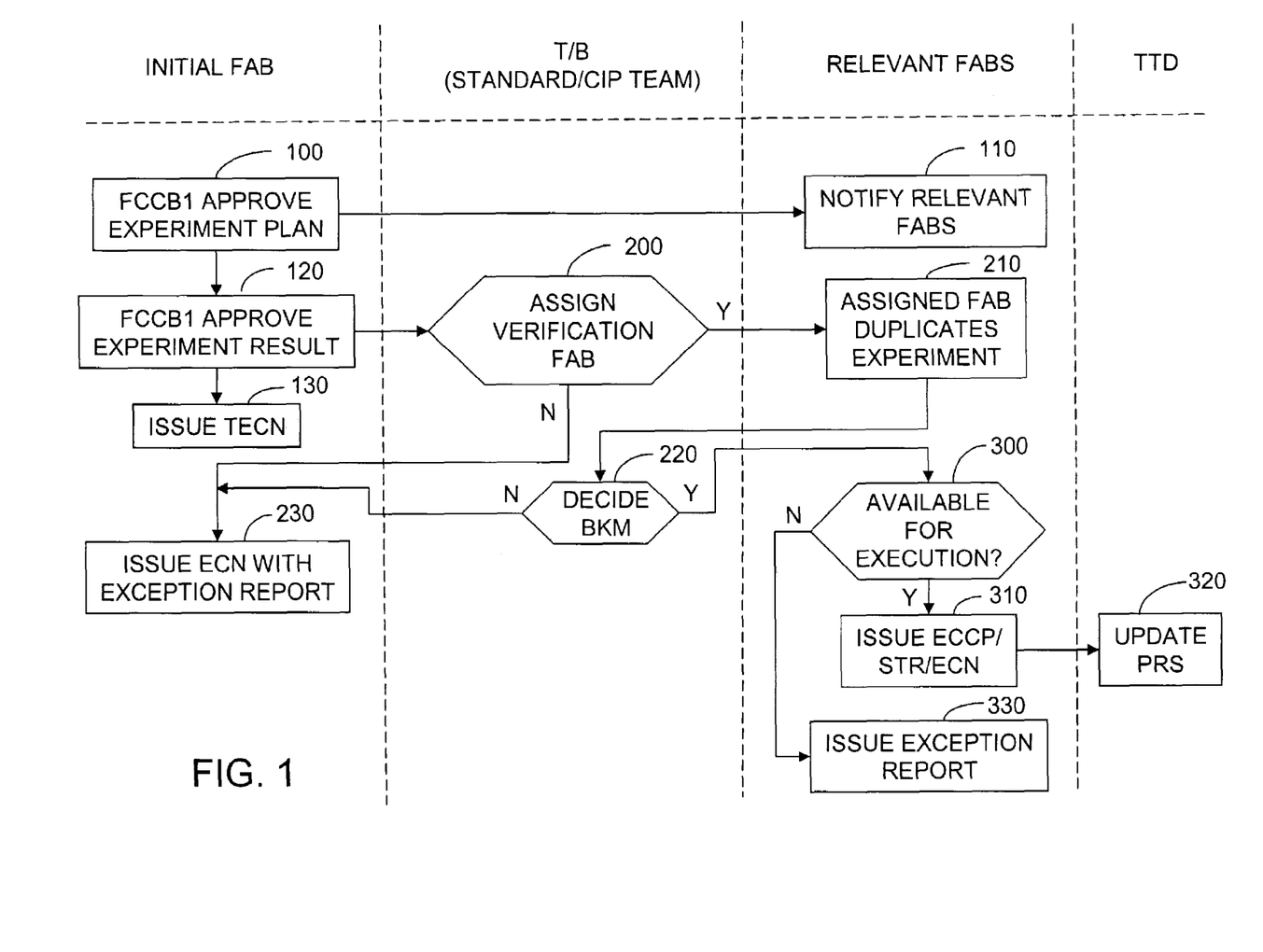
FIG. 1 is a block diagram of a change management method according to an embodiment of the present invention.

FIG. 1 is a flow chart diagram of an exemplary method for managing cross fab engineering changes. In one example, the method is practiced to coordinate the engineering change process across a plurality of semiconductor fabs (belonging to an integrated circuit foundry), with partially overlapping technologies. However, the method may be practiced in any manufacturing industry where a company, joint venture or enterprise has multiple fabs. The method allows identification of best known methods (BKM), which are ideally implemented in all of the plurality of fabs that can potentially benefit from the change.

An exemplary method for managing a plurality of fabrication facilities comprises identifying a proposed new or modified fabrication method, evaluating the fabrication method against decision criteria based on use of the fabrication method to fabricate a first product at a first one of the fabrication facilities, verifying the fabrication method against the decision criteria, based on using the fabrication method to fabricate a second product at a second one of the fabrication facilities, and adopting the fabrication method as a best known method among the plurality of fabrication facilities, if the fabrication method satisfies the decision criteria. In some embodiments, the first and second products are the same product. In other embodiments, the first and second products are different from each other, but their fabrication methods include some common processing steps.

In FIG. 1, the activities are divided among four general groups of participants. The first (left) column includes steps performed at the "initial fab." The initial fab is the first fab to implement a proposed engineering process change in an experiment. The initial fab will often be the fab where a manufacturing problem is first identified as having an unacceptable impact on yield or quality. The second column includes steps performed by the technical board (T/B), which is the body responsible for process configuration control among the fabs. The third column indicates activities performed by the "relevant fabs" for a given engineering change. The relevant fabs include all the fabs that share with the initial fab a given technology impacted by a proposed change (i.e., either the same product, or another product fabricated by similar processing steps). Thus, for a given engineering change, the relevant fabs include the fabs that may potentially benefit from adoption of the engineering change if that change is implemented. The fourth (right) column indicates the step performed by the technology transfer division (TTD), responsible for transferring technology between and among fabs.

In FIG. 1, the change management process is divided into three stages. Stage 1 includes steps 100-130. In stage 1, a cross-fab engineering change is proposed. The initial fab tests the proposed change and the relevant fabs are notified. Stage 2 includes steps 200-230. In stage 2, the experiment is verified by a second fab, and a decision is made whether the proposed engineering change is a BKM. Stage 3 includes steps 300-330. In stage 3, approved BKMs are implemented in the relevant fabs.

At step 100, the fab configuration control board for the initial fab (FCCB1) approves an experiment plan, which is implemented in the initial fab. Preferably, the plan is implemented in a production environment. This has two advantages: (1) if the test is successful, all the resulting products are usable, so time and materials are not wasted; and (2) there is no need to build a special test facility.

At step 120, after the experiment is performed at the initial fab, the results of the experiment are analyzed. A plurality of predetermined evaluation criteria are described below, to aid in determining whether the proposed change should be considered for adoption as a BKM. If the criteria are failed at the initial fab, then the procedure ends, because the proposed engineering change is identified as not being a BKM. If the criteria are met, then the FCCB1 approves the experiment result. If the results are satisfactory, then the initial fab issues a temporary engineering change notice (TECN) in step 130 to document that the change is in place at that fab on an interim basis. The results are also passed on to the T/B.

At step 110, the relevant fabs are notified of the experiment plan in one embodiment. The relevant fabs are identified through use of a "technology availability table," which lists the fabs at which each of a plurality of products is produced. An example of a technology availability table listing five fabs and six different products is shown in table 1. At this time, before the T/B meets to decide whether to verify the experiment at a second fab, the relevant fabs each study the proposed change and evaluate its impact on process flow, cost, cycle time and the like, at each fab (concurrence engineering).

TABLE 1

| Product | Fab | | | | |
|---------|---|---|---|---|---|
|         | 3 | 4 | 5 | 6 | 7 |
| 025_G   | ✓ | ✓ | ✓ | ✓ | ✓ |
| 025_EF  | ✓ | ✓ | ✓ |   | ✓ |
| 018_G   | ✓ | ✓ | ✓ |   | ✓ |
| 018_EF  | ✓ | ✓ | ✓ |   | ✓ |
| 013_G   | ✓ |   | ✓ |   | ✓ |
| 013_EF  | ✓ |   | ✓ |   | ✓ |

If there are no "relevant fabs" listed in the technology availability table (other than the initial fab), then the change is not a "cross-fab" change. That is, there is no cross-fab impact, and it is premature to consider this change as a best known method. Consideration of this change as a BKM across fabs can be delayed until at least one other relevant fab begins to make a product that uses the technology.

Stage 2 begins at step 200, in which the T/B decides whether to assign one of the relevant fabs to serve as verification fab for the proposed engineering change. The technical board STanDardization/Continuous Improvement Project team (STD/CIP team) hosts a meeting to discuss the benefit and side effect of the initial fab's engineering change with the representatives of the initial and relevant fabs. The initial fab and the relevant fabs are all represented at the T/B, and discuss how to efficiently solve the problem encountered by the initial fab. The experiment plan developed by the initial fab is considered by the T/B. A decision is made whether the experiment plan warrants duplication at another fab for consideration as a BKM. Preferably, the decision is made by consensus of the attendees. If the meeting concludes that the engineering change has more benefit than side effects, the chairman of the T/B assigns one validation fab from among the relevant fabs to duplicate the experiment (on an actual production line) for repeating the analysis.

A variety of factors may be considered in deciding which fab to assign to verify the proposed change. For example, the relevant fab having the greatest production using the impacted process may be selected. Alternatively, one of the fabs may volunteer to verify the proposed change. Alternatively, if the fabs are not all equally equipped to analyze the results, the fab that is best equipped to analyze the results may be selected. Other factors may also be considered. If the T/B decides not to assign a verification fab, based on the results at the initial fab, then the initial fab proceeds to step 230, below.

At step 210, if a verification fab is assigned, the assigned fab duplicates the experiment in its own production environment. In this context, the change is duplicated; the production environments in the initial fab and in the verification fab may differ from one another. For example, the change may be implemented at the verification fab in a process for making a different product than the product manufactured at the initial fab. Testing the same change in two different production environments provides greater confidence that this change is a BKM that can be adopted across a variety of different production environments. The assigned verification fab reports the results of its testing back to the T/B.

At step 220, the T/B decides whether the proposed change should be adopted as a BKM. As explained in greater detail below, the predetermined criteria give guidance to the T/B. For example, for a given set of facts, the criteria may instruct the T/B to accept the change as a BKM, reject the change as a BKM, or give the T/B discretion to decide whether to adopt the change as a BKM. The T/B communicates its decision to the initial fab and to the relevant fabs.

In some cases, a second level of T/B approval may be required if certain conditions occur. For example, in some embodiments, if a change is of a type that would require customer notification, then an Integration Technical Board (ITB) reviews the recommendation of the T/B and makes a final decision on whether to adopt the proposed change as a BKM.

At step 230, if the change is rejected as a BKM, based on the results at the verification fab, the T/B directs the initial fab to discontinue its experiment with the proposed change. Upon submission of a formal request, the T/B may allow the initial fab to adopt the change locally, as a solution to the problem that gave rise to the engineering change proposal, even though the change does not meet the BKM criteria. For this purpose, the initial fab issues an engineering change notice (ECN) with an exception report, to document its adoption of a procedure that differs from the BKM applied at other fabs, at least on a temporary basis. The exception report explains a reason for allowing the first fabrication facility to use the fabrication method.

Stage 3 begins at step 300. If the T/B determines that the proposed change is a BKM, the change is now available to be incorporated at each relevant fab. Each relevant fab performs steps 300-330 individually. Each fab decides whether to repeat the experiment with the intent of adopting the BKM at that fab. In some instances, the BKM may require a change in equipment, so each fab determines whether such a purchase is justified, given its specific circumstances, and when to schedule the implementation. For example, a fab that already exceeds its product yield targets may choose to request a variance and not implement a particular BKM that requires an expensive capital investment.

At step 310, if a fab decides to adopt a BKM, the fab issues an Engineering Change Control Plan (ECCP), for implementing the change locally. A special test request (STR) is issued to implement the experiment at that fab, and an engineering change notice (ECN) specifies the change permanently if the experiment is successful at that fab.

At step 320, after approval of the experimental results locally at that fab, and approval of the BKM for permanent use, the technology transfer division (TTD) updates the process release standard (PRS), which records the whole manufacturing process at that fab, including the utilized machine, process recipe and parameters, performance measurement specifications, and the like.

At step 330, if the given relevant fab determines that it will not implement the BKM, then that fab issues an exception report, to document its variance from the approved BKM. The exception report explains a reason for allowing the third fabrication facility to use the different method.

Figure 3:
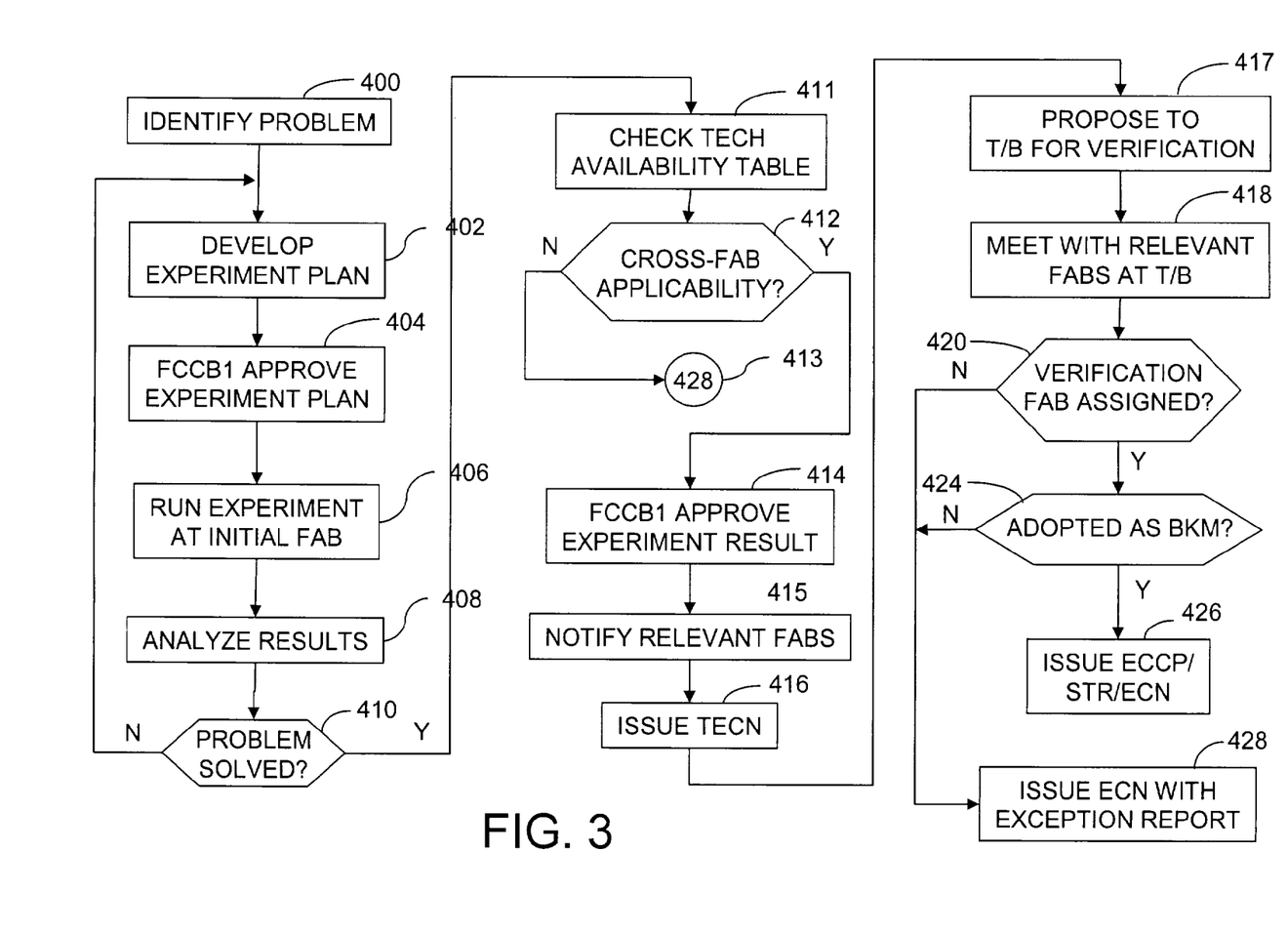
FIG. 3 is a detailed flow chart showing the activities of the initial fab.

FIG. 3 shows a more detailed view of the procedure followed by the initial fab.

At step 400, a problem is identified by the initial fab.

At step 402, an experiment plan is developed by the initial fab.

At step 404, the FCCB at the initial fab approves the experiment.

At step 406, the experiment is run at the initial fab.

At step 408, the results are analyzed to determine whether the problem is solved, and whether there are side effects.

At step 410, if the problem is not solved, then step 402 is repeated. Otherwise, step 411 is performed next.

At step 411, the initial fab checks the technology availability table to determine whether other relevant fabs make the same product.

At step 412, a determination is made whether the change has cross-fab applicability, based on the technology availability table.

At step 413, if there are no other relevant fabs (no cross-fab applicability), then at step 428 is executed.

At step 414, if there is cross-fab applicability, then FCCB approval is obtained to submit the change to the T/B and relevant fabs for consideration as a BKM.

At step 415, the relevant fabs are notified.

At step 416, a TECN is issued, which the proposed BKM is still under consideration.

At step 417, the change is submitted to the T/B.

At step 418, the initial fab and relevant fabs participate at the T/B meeting to discuss the proposed change.

At step 420, if a verification fab is assigned, then step 422 is executed. If the T/B decides not to assign a verification fab, step 428 is performed.

At step 424, if the proposed change is adopted as a BKM, then step 426 is executed. If the change is not adopted as a BKM, then step 428 is executed.

At step 426, the initial fab proceeds to issue its STR and permanent ECN.

At step 428, the initial fab issues its ECN with an exception report, to allow the initial fab to continue to use the change, which has not been adopted as a BKM.

Following the above described procedure of FIGS. 1 and 3, an orderly process is established for managing change at a plurality of fabs. Beneficial changes are tested independently at two fabs, followed by an orderly decision process on whether to adopt the change as a BKM. Documentation procedures capture which fabs have implemented each change, and any exceptions, with reasons therefore.

In preferred embodiments, a predetermined set of objective criteria is used by the T/B to decide whether to adopt a change as a BKM. In some embodiments, a two step analysis is performed. In the first step, specific predetermined criteria are applied to determine whether the proposed change has at least one significant benefit (from a predetermined list of benefit types) and/or at least one significant side effect (from a predetermined list of side-effect types). In the second step, a set of rules are applied to the results of the first step. Many of the decisions can be made automatically based on these objective criteria and rules. The exemplary rules also define a subset of the proposed changes for which the decision is not made automatically, and subjective consideration by the T/B members is appropriate to make a final decision. Thus, the clear cases are filtered out by the criteria and rules, to reduce the work of the T/B, and generate more uniformity in treatment of proposed changes.

An exemplary list of significant benefit criteria is set forth below. A change is considered to have significant benefits if any of the following conditions (a) to (h) is satisfied. The T/B can choose this set of criteria, or an alternate set of criteria.

(a) Cpk improves by at least 10%, where Cpk is statistically defined as the absolute value of the closest device specification value to the mean, minus the mean, divided by half of the process width (3 sigma). For normal distributions the Cpk value can be directly related to the percent defectives.

(b) CP/FT yield improves more than 1%, where CP (Circuit Probe) and FT (Final Test) are two process stages. A product is ready for sale after completing CP or FT.

(c) Improves process reliability from "fail" to "pass"

(d) Cost reduction of more than 10% for single process step or 0.5% for process flow.

(e) Cycle time reduction more than 0.5 day.

(f) Improve customer's service (visible to the customer) or enables a customer's requirement to be met.

(g) Scrap rate is improved by 5%.

(h) Prevent a "major event"

Although a specific exemplary set of benefit criteria is described above, other criteria may be selected by the T/B. For example, any of the following criteria may be substituted for the corresponding criteria (a), (b), (d), (e), or (g):

(a1) whether the fabrication method improves yield of a process by a first threshold percentage;

(b1) whether the fabrication method improves product yield by more than a second threshold percentage;

(d1) whether the fabrication method reduces costs by more than a third threshold percentage;

(e1) whether the fabrication method reduces fabrication cycle time by a threshold amount; or (g1) whether a product scrap rate is improved by a threshold percentage.

An exemplary list of significant side-effect criteria is set forth below. A change is considered to have significant side-effects if any of the following conditions (i) to (o) is satisfied. The T/B can choose this set of criteria, or an alternate set of criteria.

(i) Cpk is reduced by at least 10.

(j) CP/FT yield is reduced more than 1%.

(k) Degrades process reliability from "pass" to "fail"

(l) Cost increase of more than 10% for single process step.

(m) Cycle time increase more than 0.5 day.

(n) Damages the customer's service or causes a customer to complain.

(o) Wafer acceptance test (WAT) shift of more than 5% and one standard deviation for key and critical parameter, or WAT shift of more than 10% and two standard deviation for other parameter.

Although a specific exemplary set of side-effect criteria is described above, other criteria may be selected by the T/B. For example, any of the following criteria may be substituted for the corresponding criteria (i), (j), (m), (n), or (o):

(i1) whether the fabrication method reduces yield of another process by a first threshold percentage;

(j1) whether the fabrication method raises costs of another process by more than a second threshold percentage;

(m1) whether the fabrication method increases fabrication cycle time of another process by a threshold amount;

(n1) whether the fabrication method degrades customer service or causes a customer complaint; or (o1) whether a whether a wafer acceptance test rate degrades by a third threshold percentage.

Further, a T/B can add to, or subtract from, the benefit list and/or the side-effect list, as it deems appropriate.

Figure 2:
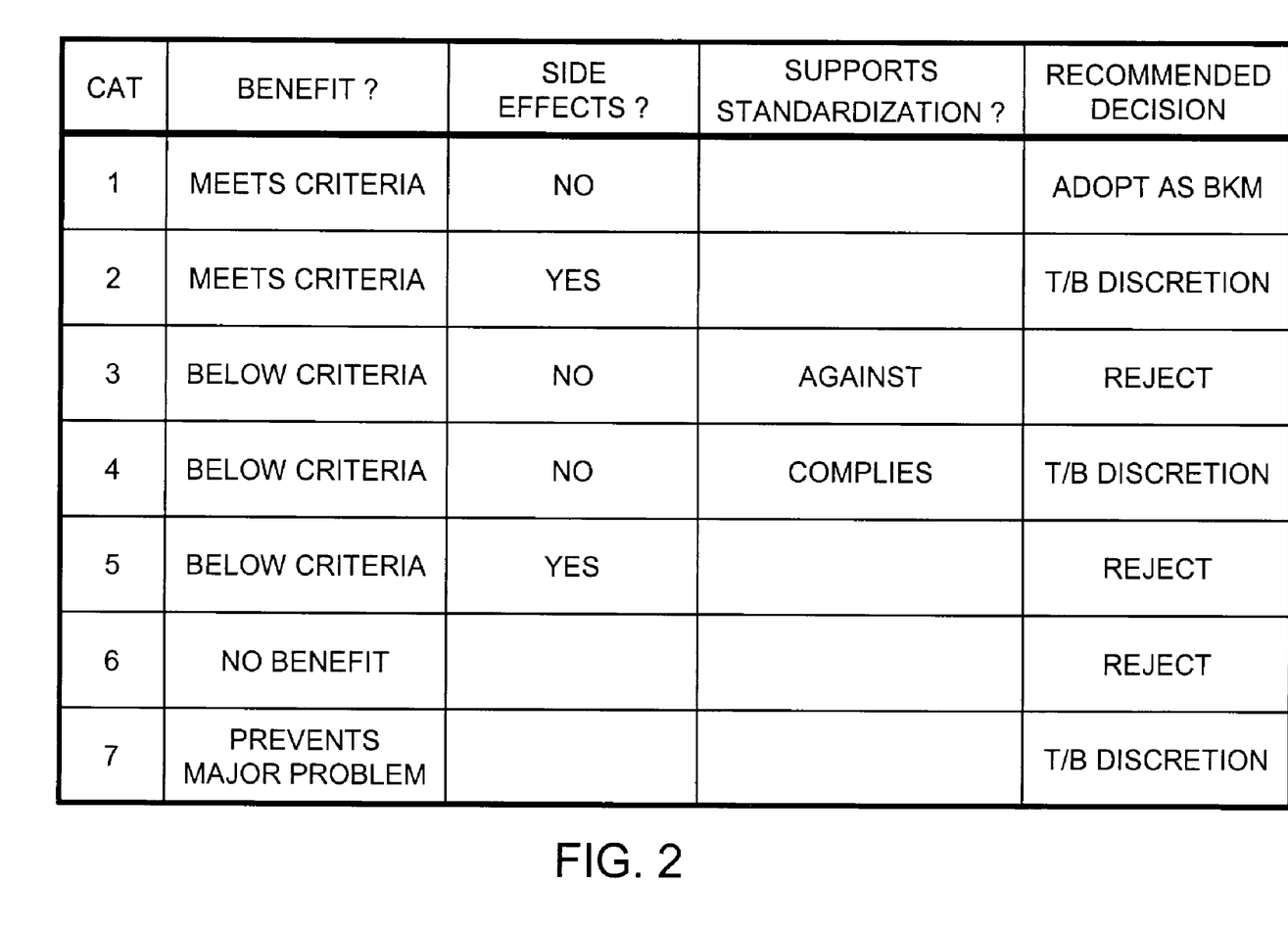
FIG. 2 is a table of decision criteria for determining whether a proposed change is a best known method.

FIG. 2 shows a table of general criteria that are used to determine whether to adopt a proposed change as a BKM. The changes can be grouped into seven general categories.

In category 1, the proposed change has a significant benefit, based on the above criteria (a) to (h) (or other set of criteria adopted by the T/B). The proposed change has none of the side effects (i) to (o). A change in this category should be adopted as a BKM.

In category 2, the proposed change satisfies at least one of the benefit criteria (a) to (h), but has at least one of the side effects (i) to (o). For changes in this category, the T/B has discretion to consider all the facts and circumstances, and weigh the costs and benefits to decide whether to adopt the change as a BKM.

In category 3, the proposed change has some benefit and none of the side effects (i) to (o), but the benefit is not large enough to satisfy any of the benefit criteria (a) to (h). The change would divert the process significantly from the standard process flow. All changes in this category should be rejected, as not a BKM.

In category 4, the proposed change has some benefit and none of the side effects (i) to (o), and does not divert the standard process flow, but the benefit is not large enough to satisfy of the benefit criteria (a) to (h). For changes in this category, the T/B has discretion to consider all the facts and circumstances, and weigh the costs and benefits to decide whether to adopt the change as a BKM.

In category 5, the proposed change has some benefit, but the benefit is not large enough to satisfy any of the benefit criteria (a) to (h), and the proposed change has at least one of the side effects (i) to (o). All changes in this category should be rejected, as not a BKM.

In category 6, the proposed change has no benefit. All changes in this category should be rejected, as not a BKM, regardless of side effects or effect on the standard process flow.

In category 7, the proposed change prevents a major "event" or problem. Each fab has local rules and procedures that define what constitutes a major event at that fab. If a proposed change prevents a major event, then the T/B has discretion to consider all the facts and circumstances, and weigh the costs and benefits to decide whether to adopt the change as a BKM.

In addition to providing a coordination methodology, the exemplary management system further comprises a method of evaluating performance of one of the fabrication facilities based on at least one of the following metrics:

(a) a number of proposed fabrication methods that are initiated by the one fabrication facility;

(b) a percentage of adopted best known methods that are implemented by the one fabrication facility; and (c) an elapsed time between adoption of the fabrication method as a BKM and implementation of the fabrication method at the one fabrication facility.

Similarly, performance of the second facility may be evaluated based on an elapsed time between assignment of responsibility to the second facility for verifying the fabrication method and adoption of the fabrication method as a best known method.

In some embodiments, a software tool assists the T/B in tracking all of the problems that are entered into the system and all of the due dates and completion dates for each verification activity of the relevant fabs. The status of each fab is tracked. This system automatically issues reminders as each due date approaches and/or alarms if a scheduled activity is not completed before the due date.

For example, an exemplary timeline for milestones includes:

(a) The T/B assigns a verification fab within 14 days after the ECCP completion by the initial fab.

(b) The verification fab is expected to complete its ECCP within two months from being assigned by the T/B.

(c) The T/B decides whether to adopt a verified method as a BKM within 14 days after the ECCP by the verification fab.

(d) Follow up is conducted with all relevant fabs two months after ECN completion after adoption of a BKM by the T/B.

Upon approval of a BKM by the T/B, the approval date can be entered into the system, and due dates for the above four milestones are automatically generated. Based on the due dates and completion dates, the system can generate a plurality of reports.

For example, in one exemplary system, the report identifies, for each proposed change: the T/B involved (There may be more than one T/B at a foundry), an identification of the initial ECCP, the purpose or benefit of the proposed change, the current status, whether the change was adopted as a BKM, the initial fab, the date tested at the initial fab, the validation fab, the due date for verification, the impacted technology, and a classification (where the classification determines whether customers must be notified of the change).

In addition, for each relevant fab, the report may identify whether the necessary processes and/or tools are available to adopt the BKM, whether an exception is taken from adopting the BKM, the date implementation of the BKM is scheduled, the governing ECCP, STR, TECN and/or ECN, and the effective date of each, the responsible person for implementation at that fab, and the current status of the implementation at that fab.

In some embodiments, the above performance data are tracked separately for each fab. This enables the fab director to provide feedback to the employees at his or her fab on their timely implementation of the BKMs, relative to performance at other fabs. The fab director can also view analogous statistics for the other fabs. This gives the fab employees an incentive to compete with each other.

In addition to providing metrics for the fabs, the T/B performance can also be measured. For example, the BKM decision time by the T/B can be tracked over a variety of proposed changes. Also, the BKM implementation rate and time can be tracked by T/B, so that the various T/Bs (in enterprises having more than one T/B) can compare their effectiveness with that of their peers.

One of ordinary skill can construct a database to capture the above information for each proposed BKM, and for each relevant fab that is to adopt each BKM, using a commercially available database management system such as Microsoft Access, or Oracle.

The exemplary method described above allows the foundry to use the T/B to verify and decide a BKM using production facilities in a timely manner, instead of constructing a costly pilot lab. Potential impacts on other products can be reduced. Use of the above described method can increase the BKM close rate (time to implementation of a BKM by the relevant fabs), reduce decision time to adopt a change as a BKM, review impacts of the proposed change, and reduce the number of redundant experiments to support adoption of a BKM across all the fabs in a foundry. Concurrence engineering, along with early notification of the proposed change to the relevant fabs, further reduces BKM implementation time. This method obtains leverage from the technology availability table. The change management database also provides a tool for determining when to notify customers of a change for which notice is required.

The exemplary embodiments of present invention are embodied in the form of computer-implemented processes and apparatus for practicing those processes. Other embodiments are in the form of computer program code embodied in tangible media, such as random access memory (RAM), floppy diskettes, read only memories (ROMs), flash EEPROMs, CD-ROMs, DVD-ROMs, hard drives, high density (e.g., "ZIP™") removable disks, or any other computer-readable storage medium, wherein, when the computer program code is loaded into and executed by a computer, the computer becomes an apparatus for practicing the invention. Other embodiments are in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for evaluating and implementing an engineering change in a product fabrication method among a plurality of fabrication facilities having at least some fabrication processes in common, comprising the steps of:
   (a) forming a technical board responsible for process configuration control among the plurality of fabrication facilities, the technical board comprising a representative from each of the fabrication facilities;
   (b) an initial fabrication facility identifying a proposed new or modified product fabrication method;
   (c) the initial fabrication facility developing an experiment plan to test the proposed new or modified fabrication method at the initial fabrication facility;
   (d) a fabrication configuration control board at the initial fabrication facility approving the experiment plan for testing at the initial fabrication facility;
   (e) testing a first time the proposed new or modified fabrication method on an actual production line at the initial fabrication facility to fabricate a first product;
   (f) the fabrication configuration control board at the initial fabrication facility evaluating results of the testing of the proposed fabrication method against predetermined decision criteria;
   (g) the fabrication configuration control board at the initial fabrication facility approving the results of the testing for adoption of the proposed fabrication method as a best known method based upon meeting predetermined decision criteria;
   (h) the initial fabrication facility identifying other relevant fabrication facilities having a common fabrication process with the initial fabrication facility impacted by the proposed new or modified fabrication method;
   (i) notifying the other relevant fabrication facilities and the technical board of the proposed fabrication method;
   (j) each of the other relevant fabrication facilities studying impacts of the proposed fabrication method on their respective facility;
   (k) hosting a meeting between the technical board and representatives of the initial fabrication facility and each of the other relevant fabrication facilities after the notifying step to discuss benefits and side effects of the proposed fabrication method, wherein the other relevant fabrication facilities base their discussion on studying impacts of the proposed fabrication method on their respective facility;
   (l) the technical board selecting a second fabrication facility from the other relevant fabrication facilities to duplicate the proposed fabrication method tested at the initial fabrication facility to determine whether the proposed fabrication method can be adopted at the other relevant fabrication facilities as a best known method;
   (m) verifying the fabrication method against the decision criteria, by testing a second time the proposed fabrication method on an actual production line to fabricate a second product at the second fabrication facility;
   (n) the second fabrication facility reporting results of the second time testing of the proposed fabrication method to the technical board;
   (o) the technical board analyzing the test results of the second testing to determine whether the proposed fabrication method should be adopted as a best known method upon meeting the predetermined decision criteria; and
   (p) the technical board deciding and adopting the fabrication method as the best known method among the plurality of fabrication facilities, if the fabrication method satisfies the decision criteria.

2. The method of claim 1, wherein each of the other relevant fabrication facilities studying impacts of the proposed fabrication method on their respective facility in step (j) includes impact on process flow, cost, and cycle time.

3. The method of claim 1, wherein the second fabrication facility is selected based on considering at least one of the following factors including greatest production using the proposed fabrication method, volunteering to verify the proposed change, and best equipped facility to analyze results of the experiment plan.

4. The method of claim 1, wherein the decision criteria include whether the proposed fabrication method provides at least one predetermined type of benefit.

5. The method of claim 1, wherein the decision criteria include at least one of the following determinations:
   (a) whether the fabrication method improves yield of a process by a first threshold percentage;
   (b) whether the fabrication method improves product yield by more than a second threshold percentage;

(c) whether the fabrication method reduces costs by more than a third threshold percentage;

(d) whether the fabrication method reduces fabrication cycle time by a threshold amount;

(e) whether the fabrication method improves customer service or meets a requirement of a customer; or (f) whether a product scrap rate is improved by a threshold percentage.

6. The method of claim 1, wherein the decision criteria include whether the fabrication method has at least one predetermined type of side effect.

7. The method of claim 6, wherein the side effect includes at least one of the following:

(a) whether the fabrication method reduces yield of another process by a first threshold percentage;

(b) whether the fabrication method raises casts of another process by more than a second threshold percentage;

(d) whether the fabrication method increases fabrication cycle time of another process by a threshold amount;

(e) whether the fabrication method degrades customer service or causes a customer complaint; or (f) whether a whether a wafer acceptance test rate degrades by a third threshold percentage.

8. The method of claim 1, further comprising: maintaining a technology availability table that identifies other fabrication facilities capable of fabricating a given product impacted by the proposed fabrication method; and using the technology availability table in the identifying step to identify the other relevant fabrication facilities.

9. The method of claim 1, further comprising: deciding to adopt the proposed fabrication method as a best known method, if at least one decision criterion involving a benefit of the fabrication method is met and at least one other decision criterion involving a side effect of the fabrication method is failed.

10. The method of claim 1, further comprising: deciding to adopt the proposed fabrication method as a best known method, if at least one decision criterion involving a benefit of the fabrication method is only partially met, and the fabrication method does not interfere with a standard process flow.

11. The method of claim 1, further comprising: allowing the initial fabrication facility to use the proposed fabrication method if:

(a) the fabrication method is not adopted as the best known method, and (b) an exception report explains a reason for allowing the initial fabrication facility to Use the fabrication method.

12. The method of claim 1, further comprising: allowing a third fabrication facility to use a method different from the proposed fabrication method if:

(a) the fabrication method is adopted as the best known method, and (b) an exception report explains a reason for allowing the third fabrication facility to use- the different method.

13. The method of claim 1, further comprising evaluating performance of one of the fabrication facilities based on at least one of the group consisting of: a number of proposed fabrication methods that are initiated by the one fabrication facility; a percentage of adopted best known methods that are implemented by the one fabrication facility; and an elapsed time between adoption of the fabrication method as a best known method and implementation of the fabrication method at the one fabrication facility.

14. The method of claim 1, wherein the fabrication facilities are integrated circuit fabrication facilities.

15. The method of claim 1, wherein the plurality of fabrication facilities are production facilities contained in separate buildings from each other.

16. The method of claim 1, wherein the plurality of fabrication facilities are located in separate cities from each other.

17. The method of claim 1, wherein the first product is a commercial integrated circuit product.

18. A method for evaluating and implementing an engineering change in a semiconductor product fabrication process among a plurality of semiconductor fabrication facilities having at least some fabrication processes in common, the method comprising the steps of:

(a) forming a technical board responsible for product fabrication process configuration control among the plurality of fabrication facilities, the technical board comprising a representative from each of the semiconductor fabrication facilities;

(b) an initial fabrication facility proposing an engineering change in a product fabrication process at the initial semiconductor fabrication facility;

(c) the initial fabrication facility developing an experiment plan to test the engineering change at the initial fabrication facility;

(d) a fabrication configuration control board at the initial fabrication facility approving the experiment plan for testing at the initial fabrication facility;

(e) testing a first time the engineering change in the product fabrication process on an actual production line at the initial fabrication facility;

(f) the fabrication configuration control board at the initial fabrication facility analyzing results of the testing to determine whether the proposed engineering change should be adopted as a best known method upon meeting predetermined evaluation criteria;

(g) the fabrication configuration control board at the initial fabrication facility approving the results of the testing;

(h) the initial fabrication facility identifying other relevant product fabrication facilities having a common fabrication process impacted by the proposed engineering change, wherein the other relevant fabrication facilities are identified from a technology available table which lists fabrication facilities at which each of a plurality of products are produced;

(i) notifying the other identified relevant fabrication facilities and the technical board of the proposed engineering change in the semiconductor fabrication process for consideration;

(j) the other relevant fabrication facilities each studying the proposed engineering change to evaluate impacts on their respective facility;

(k) hosting a meeting between the technical board and representatives of the initial and other relevant fabrication facilities after the studying step (i) above to discuss benefits and side effects of the proposed engineering change, wherein the other relevant fabrication facilities base their discussion on prior consideration of the proposed engineering change based upon the previous notification;

(l) the technical bard assigning a second fabrication facility from the relevant fabrication facilities to duplicate the proposed fabrication method evaluated at the first one of the fabrication facilities;

(m) testing a second time the proposed engineering change in the product fabrication process on an actual production line at the second fabrication facility;
(n) the second fabrication facility reporting results of the second time testing of the proposed engineering change to the technical board;
(o) the technical board analyzing the test results of the second testing to determine whether the proposed engineering change should be adopted as a best known method upon meeting the predetermined evaluation criteria; and
(p) the technical board deciding and adopting the proposed engineering change in the product fabrication process as a best known method among the initial and other relevant fabrication facilities, if the engineering change satisfies the evaluation criteria in both the first and second testing.

19. The method of claim 18, further comprising a step after step (p) of each other relevant fabrication facility except the initial and second fabrication facilities deciding whether to repeat the testing with the intent of adopting the best known method.

20. The method of claim 19, further comprising a step of an other relevant fabrication facility requesting a variance to not implement the proposed fabrication change based the other facility already exceeding its product yield targets.

* * * * *

UNITED STATES PATENT AND TRADEMARK OFFICE
CERTIFICATE OF CORRECTION

PATENT NO. : 7,415,421 B2
APPLICATION NO. : 10/365260
DATED : August 19, 2008
INVENTOR(S) : Shih-Wen Tu et al.

It is certified that error appears in the above-identified patent and that said Letters Patent is hereby corrected as shown below:

Column 11, line 16, delete "casts" and insert -- costs -- therefor.

Column 11, line 47, delete "Use" and insert -- use -- therefor.

Column 12, line 61, delete "bard" and insert -- board -- therefor.

Signed and Sealed this

Nineteenth Day of May, 2009

JOHN DOLL
*Acting Director of the United States Patent and Trademark Office*